(12) United States Patent
Cao et al.

(10) Patent No.: US 10,148,915 B2
(45) Date of Patent: Dec. 4, 2018

(54) LIGHTING SYSTEM WITH MONITORING AND ALARM FUNCTION

(71) Applicant: Ningbo Yamao Optoelectronics Co., Ltd., Zhejiang (CN)

(72) Inventors: Maojun Cao, Zhejiang (CN); Yunhai Du, Zhejiang (CN); Hu Fang, Zhejiang (CN); Bin Yu, Zhejiang (CN); Yinyong Zhou, Zhejiang (CN)

(73) Assignee: NINGBO YAMAO OPTOELECTRONICS CO., LTD., Zhenjiang (CN)

( * ) Notice: Subject to any disclaimer, the term of this patent is extended or adjusted under 35 U.S.C. 154(b) by 169 days.

(21) Appl. No.: 15/239,082

(22) Filed: Aug. 17, 2016

(65) Prior Publication Data

US 2017/0339376 A1    Nov. 23, 2017

(30) Foreign Application Priority Data

May 23, 2016 (CN) .......................... 2016 1 0352036
May 23, 2016 (CN) ...................... 2016 2 0483637 U

(51) Int. Cl.

| | |
|---|---|
| G08B 13/196 | (2006.01) |
| H04N 7/18 | (2006.01) |
| H04N 5/225 | (2006.01) |
| G08B 17/103 | (2006.01) |
| H04N 5/247 | (2006.01) |
| H04N 5/33 | (2006.01) |
| H05B 37/02 | (2006.01) |

(52) U.S. Cl.
CPC ........... *H04N 7/181* (2013.01); *G08B 13/196* (2013.01); *G08B 17/103* (2013.01); *H04N 5/2256* (2013.01); *H04N 5/247* (2013.01); *H04N 5/332* (2013.01); *H05B 37/0227* (2013.01); *H05B 37/0272* (2013.01)

(58) Field of Classification Search
None
See application file for complete search history.

(56) References Cited

U.S. PATENT DOCUMENTS

| | | | |
|---|---|---|---|
| 2013/0245827 A1* | 9/2013 | Shetty | ................... B25J 9/1697 700/259 |
| 2014/0266669 A1* | 9/2014 | Fadell | .................. G05B 19/042 340/501 |
| 2015/0163867 A1* | 6/2015 | Recker | ...................... H02J 9/02 315/250 |

* cited by examiner

*Primary Examiner* — Christopher G Findley
(74) *Attorney, Agent, or Firm* — Andrew F. Young, Esq.; Lackenbach Siegel, LLP

(57) ABSTRACT

The invention relates to the field of security, more particularly, to a lighting system with monitoring and alarm function. The illuminating module can supply sufficient light for the monitoring are of the monitoring module, so as to improve the clarity of the monitoring data collected by the monitoring module, and the mobile terminal can control the monitoring module and the illuminating module by the control instruction remotely, to provide convenience for user's remote operation; in addition, the mobile terminal can acquire the illuminating information and the monitoring data easily, which realizes user's remote monitoring, and facilities users to grasp the situation of monitoring area, and when huge amount of smog appears or some human activities appearing at a region that should have no people in monitoring area during monitor process, it will promptly reminds uses, which provides a good security effect.

9 Claims, 1 Drawing Sheet

LIGHTING SYSTEM WITH MONITORING AND ALARM FUNCTION

CROSS-REFERENCE TO RELATED APPLICATIONS

The present application claims priority to and the benefit of Chinese Patent Application No. CN 201620483637.5 and CN 201610352036.5 both filed on May 23, 2016, the entire content of which is incorporated herein by reference.

BACKGROUND OF THE INVENTION

1. Field of the Invention

The invention relates to the field of security, more particularly, to a lighting system with monitoring and alarm function.

2. Description of the Related Art

The network camera system provides convenience for remote monitoring, and a terminal equipment can access the IP address of the network camera in the network camera system through user agreements, to achieve the remote acquirement of the image. However, the difference of the shooting circumstances of the network camera would lead to the differences of the shooting effect of the image; for instance, insufficient light leads to less light and low resolution of images. Furthermore, the terminal equipment usually limits by the addressing of network camera, and can not changes the running state of the network camera, and the network camera can not changes the running state according to the needs of consumers in real-time, and the maneuverability of consumers is not good.

In some monitoring systems, the information in monitoring area is usually monitored by a camera; however, when huge amount of smog or some human activities appearing in places, which should be unmanned regions, occurs in monitoring area during monitor process, it would not promptly reminds consumers, and has safety hazard.

SUMMARY OF THE INVENTION

Aimed at the above-mentioned problems existing in the prior art, this invention provides a lighting system with monitoring and alarm function.

The specific technical proposal is as follows:

a lighting system with monitoring and alarm function comprises:

a monitoring module, configured to collect the monitoring data in a monitoring area;

an illuminating module, integrated with the monitoring module on a same device, and configured to provide lighting for the monitoring area;

a control module, connected with the monitoring module and the illuminating module respectively, and configured to receive and output the monitoring data and the illuminating information;

a cloud server, connected with the control module, and configured to store and transmit the monitoring data and the illuminating information;

a terminal equipment, controllably connected with cloud server in communication way, for receiving the monitoring data and the illuminating information; and the terminal equipment sending control instruction to the control module by the cloud server, so as to remotely control the operations of the monitoring module and the illuminating module;

a smoke detector, configured adjacent to the monitoring module and connected with the control module, for storing smog situation in monitoring area and outputting a smog signal;

an infrared body sensor module, configured adjacent to the monitoring module and connected to the control module, for storing human activity in monitoring area and outputting an active signal; and an alarm module, connected to the control module;

wherein, the control module output a trigger signal according to smog signals and/or active signals to trigger the alarm module to alarm.

Preferably, the monitoring module comprise: a positioning unit, connected to the control mode; the positioning unit is configured to locate the position of the monitoring module and output a positional information; and the control module adjust a white balance of the monitoring module according to the location information.

Preferably, the illuminating module comprises: a plurality of light-emitting units connect with the control module respectively, and the control module controls a number of the operating light-emitting units according to the location information.

Preferably, the monitoring module comprises: a color camera connected to the control module, a monochrome camera connected to the control module and an IR illuminator connected to the control module;

wherein, the control module choose the color camera or the monochrome camera to work with an IR illuminator according to ambient light.

Preferably, the illuminating module comprises: a first LED light source and a second LED light source connected to the first LED light source in parallel, wherein the first LED light source and the second LED light source are two different color light.

The control module comprises: a dimming circuit, comprising:

a PWM control circuit, outputting a first PWM control mark and a second control mark according to the control instruction;

an LED control circuit, comprising a first control branch connected to the PWM control circuit and the first LED light source, and a second control branch connected to the PWM control circuit and the second LED source, the first control branch controls a lighting situation of the first LED light source according to the first PWM control signal, and the second control branch controls a lighting situation of the second LED light source according to the second PWM control signal.

Preferably, the first LED light source and the second LED light source all are configured with a first filter, blocking UV and IR; and a second filter and a third filter are configured in front of the monitoring unit, the second filter adjust the quantity of light, the third filter band-pass-filters in the monitor areas.

Preferably, the monitoring module comprises a left channel camera, a right channel camera and a synchronous processing unit connected to the left channel camera and the right channel camera, the synchronous processing unit makes process of data fusion of a first monitoring data, collected by the left channel camera, and the monitoring data collected by the right channel camera, according to a synchronization mechanism, and outputs the monitoring data to the control module.

Preferably, the monitoring data is video data, the control module comprises an MPEG4 video decoder, connected with the synchronous processing unit, and compressing video data and outputting the compressed data.

Wherein, the lighting system further comprises a route module, connected with the control module and cloud server respectively, and sending the compressed data to cloud server by RTP protocol; and cloud server saves and forwards the compressed data to the terminal equipment.

Preferably, the terminal equipment comprises:

an MPEG4 video decoder, connected with cloud server and restoring the compressed data back to the video data;

a splitting unit, connected to the MPEG4 video decoder, and splitting the video data to video data of left and right channel.

a display of a stereo display computer system, connected with the splitting unit, and displaying the video data of left and right channels.

Preferably, further comprises a power module, connected to the monitoring module and the illuminating module respectively, supplying power for the monitoring module and the illuminating module;

Wherein, the power module comprises a photovoltaic module, a rectifying circuit connected with the photovoltaic module, a battery connected with the rectifying circuit, a inverter circuit respectively connected with the rectifying circuit and the battery, and the inverter circuit is connected with the monitoring module and the illuminating module.

The positive effects of the above-mentioned technical solution are:

In the art of above-mentioned, the illuminating module provide sufficient light for the monitoring module and improve definition of monitoring data by monitoring module, and the mobile terminal can remote control the monitoring module and the illuminating module according to the instructions, provide convenience for remote operation of customers. In addition, the mobile terminal can receive the illuminating information and monitoring data and allows customer to monitor remotely at any time and is easy to grasp the situation of monitoring area for customer, and when smog or some human activities appearing at its otherwise deserted place occurs in monitoring area during monitor process, it will promptly remind consumers and has a good security effect.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
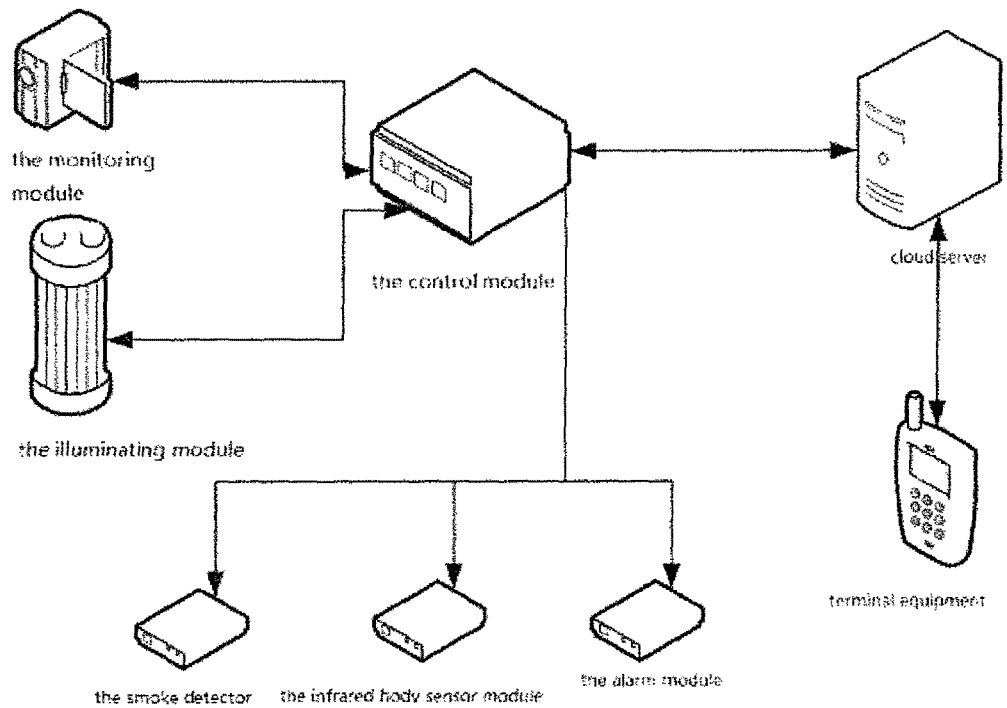
FIG. 1 is a structure diagram of an embodiment of a lighting system with monitoring and alarm function of the invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

An embodiment of the invention provides a lighting system with monitoring and alarm functions, as shown in FIG. 1, comprising:

a monitoring module, configured to collect monitoring data in a monitoring area;

an illuminating module, integrated with the monitoring module on a same device, and configured to provide lighting for the monitoring area;

a control module, connected to the monitoring module and the illuminating module respectively, and configured to receive and output the monitoring data and the illuminating information;

a cloud server, connected to the control module, and configured to store and transmit the monitoring data and the illuminating information;

a terminal equipment, controllably connected to cloud server in communication way, for receiving the monitoring data and the illuminating information; and the terminal equipment sending control instruction to the control module by the cloud server, so as to remotely control the monitoring module and the illuminating module;

a smoke detector, configured adjacent to the monitoring module and connected to the control module, for storing smog situation in monitoring area and outputting a smog signal;

a human body induction module, configured adjacent to the monitoring module and connected to the control module, for storing the situation of human activity in monitoring area and outputting an active signal; and an alarm module, connected to the control module;

wherein, the control module output a trigger signal according to smog signals and/or active signals to trigger the alarm module to alarm.

In the embodiment of the invention, the monitoring module comprises a camera device; further, the monitor module comprises a web camera, and since the web camera uses existing technology, there is no need to say more. The monitoring data collected by the monitoring module can be image information or video, and the illuminating module provide enough light for the monitoring data collecting of the monitoring module, and improves the clarity of the image or video collected by the monitoring module.

In the embodiment of the invention, communication method between the monitoring module, control module and cloud server can use cloud technology based on the existing IP network camera system, so as to achieve the high-definition processing and remote viewing of the monitoring information.

In a preferred embodiment, the terminal equipment may comprise a mobile terminal and a computer, wherein the mobile terminal can be a mobile phone, hereinafter taking the mobile terminal as example; the mobile terminal can receive the monitoring data and the illuminating information forwarded by cloud server in real-time, and meanwhile the mobile terminal cancan also send control instructions to the control module by cloud server. To be sure, the control instructions in this embodiment not only can control the monitoring module and the illuminating module, but also can control the other modules connected with the control module in the monitoring system; specific control methods can be set according to the type of the control instruction and the operating mode of control module. In a preferred embodiment, the control module can be a microcontroller or other controllers.

In this embodiment, the operating mode of the monitoring module and the illuminating module can be synchronous control module, also can be asynchronous control mode, that the control mode can turn on and off the monitoring module and the illuminating module together or separately.

In the embodiment, taking the communication process between the mobile phone and the cloud server as an example, a mobile phone send a subscription message to cloud server, and the subscription message may comprises a user name, a password and so on, and in practice the subscription process of mobile phone and cloud server can be a registration process of a user. After the users subscription process, the can server pre-stored the subscription message sent before; the user sends an verification information to cloud server, the verification information can be the above mentioned user name and the password, and also a fingerprint information matching with the user name and the password and so on; the embodiment is not a limitation of the invention; the verification information is validated by the cloud server; if validation is succeed, which is to allow the mobile phone connecting to the cloud server, and the verification process is the process of logging via mobile phone; further, the cloud system of the embodiment can be shared by several mobile terminals.

The mobile terminal sends an verification information to cloud server. The cloud server verifies the verification information according to the subscription message; if validation is succeeded, then it is allowed that the mobile phone is connected to the cloud server. In the above embodiment, the connection between the mobile terminals can adopt common ways to register and login; Bluetooth, NFC and other near field communication methods can also be used. Any communication method that can build data communication of the mobile terminal and cloud server can be used in the embodiment; after a communication connection established, the mobile terminal can communicate the data with the cloud server.

Further, in this embodiment, the cloud server may comprise: a storage cell, which is a storage; the storage is used to save the monitoring data and illuminating information. To be sure, the storage can be SRAM (Static Random Access Memory), also it can be Cache; the Cache can save images taken in rapid shot, and provide buffer for image information exchanging, which facilitates real-time image saving.

In this embodiment, the monitoring module comprises: a camera unit, the camera unit comprises an optical module and an image sensor; the optical module and the image sensor can capture the monitoring data, and a processing unit thereof can be an imaging chip, which can process the captured monitoring data with a specific processing algorithms.

In this embodiment, the camera unit can both operate visible light shooting and infrared light shooting. For example, to use an infrared camera to get infrared night vision, i.e. under night vision state, the infrared camera can emit invisible infrared light to illuminate the shot object; by turning off the infrared filter, an image reflected by infrared ray (not an image reflected by visible light), can be seen, and the image, which cannot be seen by naked eyes in dark environment, can be shot. In addition, under monitoring state, the system automatically activate lighting function to fill light.

In this embodiment, the infrared body sensor module may use Passive Infrared (PIR) technology to sense whether an object exists in the monitoring area, and to output the object information; for example, sense whether a human body exists in monitoring area by PIR technology. Further, the infrared body sensor module of the embodiment can be a radar, which can also be used to sense whether a human body exists in the monitoring area.

In this embodiment, the route module can be a router; the router of this embodiment realizes the transmission of the monitoring data and the illuminating information from a local area network (LAN) to a wide area network (WAN), wherein the router may comprise: a plurality of LAN ports and a WAN port, and the router may also use the method of time division multiplexing for sending the monitoring data and the illuminating information to cloud server. It should be noted that, the control module and the terminal equipment of the embodiment can be in different network, for which the cloud server need provide different ports for different networks, and the ports can be network application layer ports.

In this embodiment, the smoke detector can be a smoke sensor, which is used to detect whether the smoke density existed in the monitoring area exceed standard; if smoke density is detected excessive, which means that there might be fire risk, at that point the alarm module will alarm according to the control of the control module; the control module is used to detect whether environmental information exceeds a threshold; if the threshold exceeded, output the first control instruction, and the alarm module alarms according to the first control instruction.

Further, if the control module detects smoke density excessive, it may also output an alarm message, which is sent to the mobile terminal through the cloud server; the mobile terminal receives the alarm message for further processing.

In this embodiment, the control module receives the control instruction sending by the mobile terminal; the control module can control the operation of the monitoring module through the control instrument, such as to control the monitoring module on or off; in addition, the control module can also control the illuminating module on or off.

In this embodiment, the mobile terminal can receive the monitoring data and the illuminating information saving on the cloud server any time. For example, after the cloud server and the mobile terminal established a connection, a customer operates the mobile terminal, and the mobile terminal generates an input request according to the operation of the customer, and the mobile terminal send an output request to the cloud server; the cloud server analysis the transmission request and retrieve the monitoring data or the illuminating information that correspond to the transmission request, and send to the mobile terminal, which facilitates the mobile terminal to know the monitoring situation and the illumination situation of the monitoring module.

In this embodiment, the monitoring module may be a monitoring camera; in a preferred embodiment, the illuminating module comprises: an LED lighting device (for example, comprising an LED lamp or a lamp formed by multiple LED lamp beads (or an LED module)), the monitoring data is a video message; the mobile terminal is a mobile phone; the specific practical application scenery of the embodiment is as follow: turn on the LED light (or LED module) to provide lighting for a particular monitoring area, the surveillance camera captures a video of the monitoring area, and acquires the video, and acquire the lighting parameter of the LED light (or LED module); for example, the lighting parameter can be an actual power of LED light (or LED module) etc. A cloud server saves the lighting parameter and the video, and the cloud server can also send the lighting parameter and the video to the associated mobile phone in real-time.

Preferably, the illuminating module also can comprise: at least an optical sensor, and the optical sensor is arranged at the monitoring area monitored by the monitoring module, for acquiring real-time brightness of the monitoring area, and send the acquired brightness information to the above mentioned control module, and the control module stores a brightness adjustment parameter table of the illuminating module matching with brightness information, so as to adjust the brightness of the light emitted from the illuminating module according to the current received brightness information sent from the optical sensor in real time, thus to make the brightness of monitoring area able to ensure the monitoring module can acquire a relatively good quality real-time image.

Further, if the illuminating module comprises multiple optical sensors; these optical sensors can be arranged at different positions in the monitoring area, and each of the optical sensors has a unique geographical location information mark (which can be set according to parameters like different monitoring objects, regions and space which ensure the relative location (such as height, longitude and latitude and other geographic information) of each optical sensor in the monitoring area), and each of the optical sensors sends the acquired brightness information, and, at the same time, the location information mark of the optical sensor itself and other related information to the control module; the control module may comprise a computing and judgment unit for receiving and managing the information sending by each optical sensor, and by using the computing and judgment unit, whether the insufficient of the brightness in partial area of the monitoring area is due to the lack of the brightness in the monitoring are in real or other causes can be accurately determined, and depending on the specific situation causing the lack of brightness, to adjust the brightness in the monitoring module in real time by adjusting the brightness and/or the beam angle etc. of part or all of the LED lights (or LED module) by using the geographical location information sent by each optical sensor and the sensed brightness information, so as to save energy, and realize the accurate adjustment of the brightness in the monitoring area. It should be notice that, in the embodiment, the related parameters such as the brightness information in the monitoring area and so on may alter depending on the different performance of the different monitoring device; meanwhile, the user terminal (such as mobile phone or other portable devices) can be used to realize real-time remote adjustment, so as to make the monitoring device able to satisfy personalized requirements of different users.

The monitoring module comprises: an optical module, an image sensor and a monitoring module of an imaging chip; the optical module adjusts the monitoring light path; the image sensor captures the image, of which the light path is adjusted, and outputs the monitoring data; the imaging chip processes the monitoring data according to a preset algorithm. The above mentioned image sensor can be a CMOS (Complementary Metal-Oxide Semiconductor) sensor or a CCD (Charge Coupled Device) sensor, the optical module adjusts the light path, and the image sensor captures the optical image and convert the optical image into electrical signal; the imaging chip can process the image according to the preset image algorithm and acquire a clearer image.

Herein provide a application scenario of the above embodiment: if a human appears in the monitoring area, the human can be sensed by the presented infrared body sensor module that there is security risk in monitoring area, and the information of the object sent to the cloud server can indicate the above situation, and the object information is forwarded by the cloud server to the mobile terminal, and to be further processed by the user of the mobile terminal.

In a preferred embodiment, the monitoring module comprises a positioning unit, connected with a control module. The positioning unit is arranged to position the monitoring module, and output a position information; and the control module adjust the white balance parameter of the monitoring module by using the position information.

In a preferred embodiment, the illuminating module comprises: a plurality of light-emitting units; the plurality of light-emitting units are connected to the control module individually, and the control module controls the number of the operating light-emitting units according to the location information.

In the above embodiment, the positioning unit can receive the information of longitude and latitude of the monitoring module, and determine the specific location of the monitoring module according to longitude and latitude; since the locations of user are different and the color temperature in different locations is different, the control module can save white balance parameters and the numbers of light-emitting units that corresponds to different color temperature in multiple locations in advance. The control module controls white balance parameter and the number of light-emitting units of the monitoring module according to the color temperature matching with the location of the monitoring module, In a preferred embodiment of the embodiment, the monitoring module comprises: a color camera connected to the control module, a monochrome camera connected to the control module and an IR illuminator connected to the control module.

Wherein, the control module choose the color camera or the monochrome camera to work with the IR illuminator according to ambient light.

In the embodiment, the monitoring module comprises a color camera using in the condition of bright day light, a monochrome camera using in the condition of observing in dark night by infrared illumination, and an IR illuminator; the control module choose the color camera or the monochrome camera to work with the IR illuminator according to ambient light.

The color camera has a lens most suitable for colors and with a infrared filter; the monochrome camera has a lens most suitable for monochrome observation. For the sensitivity of infrared ray, the monochrome camera can be supercharged. The IR illuminator also has a build-in switching device for visibility light or controlling artificial ambient light. The IR illuminator is turned on by the control module in a monochromatic infrared mode. The illuminator is better to provide an electromagnetic radiation lighting in a range of 805-995 nm.

The color camera and the monochrome camera both have a isolated lens, which has a zooming control separated by the control module, and provides a mode conversion of no focus shifting from day-time-operating to night-operating. In each isolated lens, the automatic aperture control panel, which controls the aperture independently, and provide the optimization of the light entering the camera or the optimization of the depth of field of focusing. The monitoring information changes from monochromatic to color according to the ambient light intensity. The currently unused energy of the camera can be cut off, and the currently unused energy of the illuminator can be cut off, too. The using of the combined control system of the above two cameras has a better monitoring effect and saves more energy compared to only using an IR illuminator or a visibility lighting in the day/night cycle.

In a preferred embodiment, the illuminating module comprises: a first LED light source and a second LED light source connected with the first LED light source in parallel, wherein, the first LED light source and the second LED light source are light sources with two different colors.

Figure 2:
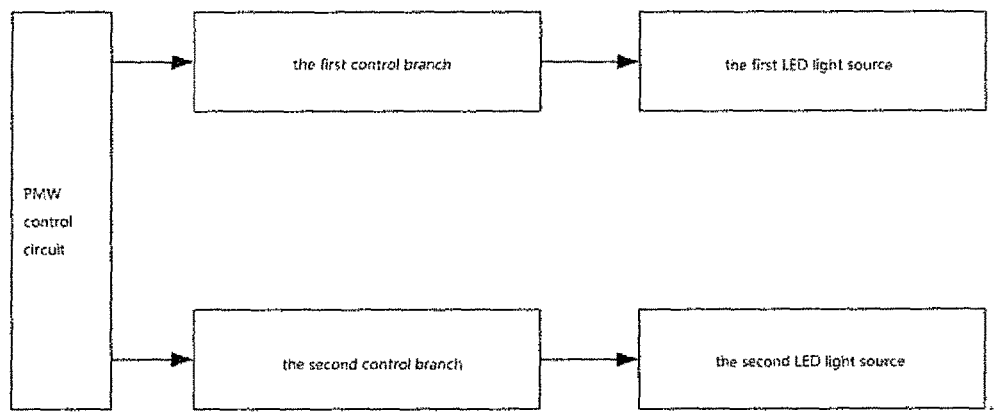
FIG. 2 is a structure diagram of an embodiment of a dimming circuit of a control module of the invention.

The control module comprises a dimming circuit; as shown in FIG. 2, the dimming circuit comprises:

a PWM control circuit, output a first PWM control mark and a second control mark according to the control instruction;

an LED control circuit, comprises a first control branch connected to the PWM control circuit and the first LED light source, and a second control branch connected to the PWM control circuit and the second LED source, the first control branch controls a lighting situation of the first LED light source according to the first PWM control signal, and the second control branch controls a lighting situation of the second LED light source according to the second PWM control signal.

In this embodiment, a two-color LED dimming circuit is provided and is connected with the first LED light source and the second LED light source through two power lines; the first LED light source and the second LED light source are composed of two LEDs with two different color connected in parallel; the positive electrode of the first LED light source is simultaneously connected to the negative electrode of the second LED light source and the first power line, and the negative electrode of the first LED light source is simultaneously connected to the positive electrode of the second LED light source and the second power line. Wherein, the PWM control circuit is arranged to convert the external voltage into operating voltage and output two PWM signals (the first PWM control signal and the second PWM control signal); the LED control circuit comprises a first control branch and a second control branch, which control the on-off of the first LED light source and the second LED light source according to the two PWM signals output from the PWM control circuit; the constant current control unit, connected with the first LED light source and the second light source, for maintaining the stability of the constant current when the first LED light source and the second light source is connecting, and ensure light effect. The PWM control circuit comprises interconnected power conversion branch and the PWM signal generation branch. The power conversion branch is used to convert the external output voltage into the operating voltage which the first LED light source and the second LED light source require, and supply power to the PWM signal generation branch; the PWM signal generation branch outputs two groups of the pulse width ratio adjustable PWM signal (the first PWM control signal and the second PWM control signal) to the LED control circuit, and causes the first LED light source and the second LED light source to be breakover and emit light. As a preferred embodiment of the invention, when one group outputs the PWM signal, the other group can directly output low level (such as 0V) signal, to cause a light source of a specific color to be breakover and emit light, and, meanwhile, the dimming function of the LED light source can be achieved by adjusting the pulse width ratio of the PWM signal, which is to achieve both the function of color modulation and dimming.

In this embodiment, the control module can also dim according to the control instruction; the control module can also use the way of analog dimming and SCR dimming to dim; the above dimming methods all belong to prior art, this embodiment does not discuss it further.

In a preferred embodiment, a first filter is arranged in front of both the first LED light source and the second LED light source; the first filter blocks UV and IR; and a second filter and a third filter are arranged in front of the monitoring unit; the second filter adjust the quantity of light, and the third filter is a band pass filter used for band pass filtering in the monitor areas.

The light between the first LED light source and the shot object in the monitoring area, and the light between the second LED light source and the shot object in monitoring area are passed through the first filter: the light reflecting from the shot object and the light in the camera (lens) are passed through the second filter and the third filter. The first filter 35 can be a UVA filter or an infrared decaying filter. The second filter can be, for example, a reusable ND filter connected to the following band pass filter. The ND filter is used to adjust the quantity of light shooting into the lens, and is to adjust the quantity of light according to the different types of the band pass filter. In addition, the second filter and the third filter have the images for acquiring the pre-set multiple different near infrared region and so on, and a filter slide mechanism which changes each filter by sliding device. It can easily change the type of the second filter and the third filter in front of the lens and with or without the filters through the arranging of the filter slide device.

In a preferred embodiment, the monitoring module comprises a left channel camera, a right channel camera and a synchronous processing unit connected to the left channel camera and the right channel camera, the synchronous processing unit makes process of data fusion of a first monitoring data, collected by the left channel camera, and the monitoring data, collected by the right channel camera, according to a synchronization mechanism, and outputs the monitoring data to the control module.

In a preferred embodiment, the monitoring data is a video data; the control module comprises an MPEG4 video decoder, connected with the synchronous processing unit, and compressing video data and outputting the compressed data.

The lighting system further comprises a route module; the route module connected with the control module and cloud server respectively, and sending the compressed data to cloud server by RTP protocol; and cloud server saves and forwards the compressed data to the terminal equipment.

In a preferred embodiment, the terminal equipment comprises:

an MPEG4 video decoder, connected with cloud server and restoring the compressed data back to the video data;

a splitting unit, connected to the MPEG4 video decoder, and splitting the video data to video data of left and right channels.

a display of a stereo display computer system, connected to the splitting unit, and displaying the video data of left and right channels.

In the above embodiment, taking that the monitoring information is a video data as an example, the process of video collection and data processing are as follows: firstly, two video collection industrial cameras with a right channel and a left channel are used to collect the video data of the remote scene; the collected video data is sent to a build-in video capture card for digital processing; the acquired digitalized video data are stored into two buffers respectively and add the synchronous control signal, and then execute data fusion to get a mixed video data; the mixed video data is comprised by the MPEG4 video encoder, to be sent to a network communication card.

Further, the process of network transmission of video data is as follows: the compressed and mixed video data is, sent to the network communication card of a local stereoscopic display computer system through internet by RTP protocol; simultaneously, the control signal is replied through internet by TCP protocol, so as to check whether the video data compression is reasonable.

Further, the process of the processing and display of the video data by the terminal equipment are as follows: the compressed and mixed video data is received from the internet, and is sent to the local communication card of the local stereoscopic display computer system; the compressed and mixed video data is restored to the mixed video data by the MPEG4 video encoder; then, the mixed video data is split into two video data of left and right channels and synchronize the data; the two video data of left and right channels are sent to the display of the stereoscopic display computer system, and the synchronous signal is sent to an LC optical shutter 3-D glass, to complete the 3-D video recreation at a remote scene.

In preferred embodiment of the present invention, it further comprises: a power module, connected to the monitoring module and the illuminating module respectively, and supplying power for the monitoring module and the illuminating module;

Wherein, the power module comprises a photovoltaic module, a rectifying circuit connected with the photovoltaic module, a battery connected with the rectifying circuit, an inverter circuit respectively connected with the rectifying circuit and the battery, and the inverter circuit is connected with the monitoring module and the illuminating module.

In this embodiment, the photovoltaic module can collect solar power, and output AC electrical energy; after rectifying the AC, the rectifying circuit outputs DC electrical energy; the battery stores the DC electrical energy for later off-network use; and the inverter commutate DC into AC and output AC to the monitoring module and the illuminating module.

A monitoring method, wherein, comprises:

STEP S1, launching the monitoring module to collect the monitoring data in monitoring area according to a preset time; detecting whether the brightness of the monitoring data is less than a preset threshold; if the data is less than the threshold, STEP S2 is performed;

STEP S2, launching a illuminating module, turn down the camera frame rate of the monitoring module;

STEP S3, adding a pure white background to the screen of the monitoring module, and turning the brightness of the screen to maximum;

STEP S4, after the acquisition of the monitoring data, removing the pure white background from the screen, and restoring the brightness of the screen and the camera frame rate of the monitoring module.

In a preferred embodiment of the present invention, STEP S1 specifically comprises:

STEP 101, reading the image data frames, returning from the camera of the monitoring module, from the memory of the monitoring module, and converting the image data frames into a bitmap;

STEP 102, adding R,G,B values of all pixel in the bitmap respectively, and dividing it by the amount of all pixels to get the average R value, average G value, and the average B value of the bitmap; or adding R,G,B values of the sampling pixels in the bitmap respectively, and divide it by the amount of the sampling pixels and get the average R value, average G value, and the average B value of the bitmap;

STEP 103, use the weighted average method for the average R value, average G value, and the average B value of the bitmap and get the average brightness of the bitmap;

STEP 104, comparing the average brightness of the bitmap with the preset threshold; if the average brightness is less than the preset threshold, it indicates that the brightness of the image is low.

In this embodiment, the camera of the monitoring module can adjust the camera frame rate; a desired camera frame rate is equivalent or close to the frame rate of the lighting device, which improves the lighting effect supplied by the lighting device; the embodiment can be applied to regular shooting and backlight compensation under the condition that light is insufficient; herein a practical application scenario of the above embodiment is provided that, after the user launches the monitoring module, the monitoring data acquired by the camera of the monitoring module (in this embodiment, taking that the monitoring data is images as example) is received automatically at regular intervals; it is checked that whether the brightness of the image is lower than the preset threshold; if the brightness is less than the preset threshold, launch the illuminating module during the shooting of the user. The interval time can be 5-30 minutes and so on.

Firstly, turn down the frame rate of the camera to prolong the exposure time, thereby improving the brightness of the shot image, and then complete shooting and after that, restore the camera frame rate; once launch the monitoring module, first, add a pure white background to the screen of the monitoring module that the user uses, turn the brightness of the screen to maximum; then complete shooting, and after that, remove the pure white background from the screen, and restored the brightness of the screen.

In the above embodiment, the illuminating module can be an LED light (or LED module); it should be noticed that the LED light (or LED module) emits light according to a first preset frequency, the monitoring module collect the monitoring data according to a second preset frequency; in this embodiment, the first preset frequency can be more or less than the second preset frequency.

For example, set the first preset time; the first preset time can be a certain period in the day-time; in the first preset time, the monitoring module collect the monitoring data according to the second preset frequency, and meanwhile the LED light (or LED module) emits light according to the first preset frequency; in order to make the lighting time of the LED light correspond to the time of collecting the monitoring data of the monitoring module, a sampling unit ban be arranged in the monitoring module, which is arranged to collect the sampling time of the monitoring module. If the first preset frequency and the second preset frequency are the same, then acquire the lighting time of the LED light (or LED module) in the first preset frequency, by calculating the delay time between the lighting time of the LED light (or LED module) in the first preset frequency and the sampling time of the monitoring module, output a delay signal, and the LED light (or LED module) can adjust the lighting time of the LED light (or LED module) in the first preset frequency according to the delay signal, to make the lighting time of the LED light (or LED module) in the first preset frequency synchronize with the sampling time of the monitoring module.

If the first preset frequency and the second preset frequency are different, a sampling unit can be arranged in the monitoring module; the sampling unit is arranged to collect the sampling time of the monitoring module, and also acquire the lighting time of the LED light (or LED module) in the first preset frequency; by calculating the greatest common divisor of the first preset frequency and the second preset frequency, output a delay signal that makes the frequency points in the greatest common divisor of the first preset frequency able to correspond to the frequency points in the greatest common divisor of the second preset frequency; the LED light (or LED module) can adjust the lighting time of the LED light (or LED module) in the first preset frequency according to the delay signal, to make the maximum synchronization of the lighting time of the LED light (or LED module) in the first preset frequency and the sampling time of the monitoring module.

Besides, a second preset time can also be set in a certain period of time during the night, the monitoring module collect the monitoring data according to the third preset frequency in the second preset time, and meanwhile the LED light (or LED module) emits light according to the first preset frequency; the third preset frequency can be higher than the second preset frequency, because during the night there may be very little people in monitoring area that needs a better monitoring effect, so to set a higher sampling frequency, such as 100 frames per second, makes the monitoring data collected by the monitoring module clearer. However, during the day time, during the night there might be a lot of people in monitoring area, the sampling frequency of the monitoring module can be appropriately reduced, such as 40 frames per second, 50 frames per second and so on. Since the higher sampling frequency, the wider bandwidth it needs during the transmission of the monitoring data, setting different preset frequency according to different preset time not only effectively reduces bandwidth, but also ensures the clarity of the monitoring data collected by the monitoring module.

To sum up, in the above technical scheme, the illuminating module can supply sufficient light for the monitoring module, that improves the clarity of the monitoring data collected by the monitoring module, and the mobile terminal can control the monitoring module and the illuminating module through the control instruction remotely, which provide convenience for user's remote operation; in addition, the mobile terminal can also acquire the illuminating information and the monitoring data, which realizes user's remote monitoring, and facilities users to grasp the situation of monitoring area in real time, and during monitoring process, if huge amount of smog appears or some human activities appears in the region, which should have no human, in the monitoring area, it will promptly reminds users and has a good security effect.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:
1. A lighting system with monitoring and alarm function, comprising:
   a monitoring module, configured to collect monitoring data in a monitoring area;
   an illuminating module, integrated with the monitoring module on a same device, and configured to provide lighting for the monitoring area;
   a control module, connected to the monitoring module and the illuminating module respectively, and configured to receive and output the monitoring data and the illuminating information;
   a cloud server, connected to the control module, and configured to store and transmit the monitoring data and the illuminating information;
   a terminal equipment, controllably connected with cloud server in communication way, for receiving the monitoring data and the illuminating information; and the terminal equipment sending control instruction to the control module by the cloud server, so as to remotely control the operations of the monitoring module and the illuminating module;
   a smoke detector, configured adjacent to the monitoring module and connected with the control module, for storing smog situation in the monitoring area and outputting a smog signal;
   an infrared body sensor module, configured adjacent to the monitoring module and connected to the control module, for storing human activity in the monitoring area and outputting an active signal; and
   an alarm module, connected to the control module;
   wherein the control module output a trigger signal according to smog signals and/or active signals to trigger the alarm module to alarm; and
   wherein the monitoring module comprises: a positioning unit, connected to the control mode; the positioning unit is configured to locate the position of the monitoring module and output a positional information; and the control module adjust a white balance of the monitoring module according to the location information;
   wherein the monitoring method comprises:
   STEP S1, launching the monitoring module to collect the monitoring data in monitoring area according to a preset time; detecting whether the brightness of the monitoring data is less than a preset threshold; if the data is less than the threshold, STEP S2 is performed;

STEP S2, launching an illuminating module, turn down the camera frame rate of the monitoring module;

STEP S3, adding a pure white background to the screen of the monitoring module, and turning the brightness of the screen to maximum;

STEP S4, after the acquisition of the monitoring data, removing the pure white background from the screen, and restoring the brightness of the screen and the camera frame rate of the monitoring module;

STEP S1 comprises:

STEP 101, reading the image data frames, returning from the camera of the monitoring module, from the memory of the monitoring module, and converting the image data frames into a bitmap;

STEP 102, adding R,G,B values of all pixel in the bitmap respectively, and dividing it by the amount of all pixels to get the average R value, average G value, and the average B value of the bitmap; or adding R,G,B values of the sampling pixels in the bitmap respectively, and divide it by the amount of the sampling pixels and get the average R value, average G value, and the average B value of the bitmap;

STEP 103, use the weighted average method for the average R value, average G value, and the average B value of the bitmap and get the average brightness of the bitmap;

STEP 104, comparing the average brightness of the bitmap with the preset threshold; if the average brightness is less than the preset threshold, it indicates that the brightness of the image is low.

2. The lighting system with monitoring and alarm function according to claim 1, wherein the illuminating module comprises: a plurality of light-emitting units, connected to the control module respectively, and the control module controls a number of the operating light-emitting units according to the location information.

3. The lighting system with monitoring and alarm function according to claim 1, wherein the monitoring module comprises: a color camera connected to the control module, a monochrome camera connected to the control module and an IR illuminator connected to the control module;
wherein, the control module choose the color camera or the monochrome camera to work with the IR illuminator according to ambient light.

4. The lighting system with monitoring and alarm function according to claim 1, wherein the illuminating module comprises: a first LED light source and a second LED light source connected to the first LED light source in parallel, wherein the first LED light source and the second LED light source are two different color light;
the control module comprises a dimming circuit, comprising:
a PWM control circuit, outputting a first PWM control signal and a second control signal according to the control instruction;
an LED control circuit, comprising a first control branch connected to the PWM control circuit and the first LED light source, and a second control branch connected to the PWM control circuit and the second LED source;
the first control branch controls a lighting situation of the first LED light source according to the first PWM control signal, and the second control branch controls a lighting situation of the second LED light source according to the second PWM control signal.

5. The lighting system with monitoring and alarm function according to claim 4, wherein the first LED light source and the second LED light source all are configured with a first filter, blocking UV and IR; and a second filter and a third filter are configured in front of the monitoring unit, the second filter adjusts the quantity of light, the third filter band-pass-filters in the monitor areas.

6. The lighting system with monitoring and alarm function according to claim 1, wherein the monitoring module comprises a left channel camera, a right channel camera and a synchronous processing unit connected to the left channel camera and the right channel camera, the synchronous processing unit makes process of data fusion of a first monitoring data, collected by the left channel camera, and the monitoring data, collected by the right channel camera, according to a synchronization mechanism, and outputs the monitoring data to the control module.

7. The lighting system with monitoring and alarm function according to claim 6, wherein the monitoring data is a video data; the control module comprises an MPEG4 video decoder, connected with the synchronous processing unit, and compressing video data and outputting the compressed data;
wherein the lighting system further comprises a route module, connected with the control module and the cloud server respectively, and sending the compressed data to the cloud server by RTP protocol; and the cloud server saves and forwards the compressed data to the terminal equipment.

8. The lighting system with monitoring and alarm function according to claim 7, wherein the terminal equipment comprises:
an MPEG4 video decoder, connected with the cloud server, and restoring the compressed data back to the video data;
a splitting unit, connected to the MPEG4 video decoder, and splitting the video data to video data of left and right channels;
a display of a stereo display computer system, connected to the splitting unit, and displaying the video data of left and right channels.

9. The lighting system with monitoring and alarm function according to claim 1, further comprising a power module, connected to the monitoring module and the illuminating module respectively, and supplying power for the monitoring module and the illuminating module;
wherein, the power module comprises a photovoltaic module, a rectifying circuit connected with the photovoltaic module, a battery connected with the rectifying circuit, an inverter circuit respectively connected with the rectifying circuit and the battery, and the inverter circuit is connected with the monitoring module and the illuminating module.

* * * * *